US007709581B2

(12) United States Patent
Glasgow et al.

(10) Patent No.: US 7,709,581 B2
(45) Date of Patent: May 4, 2010

(54) POLYCARBONATE-POLYSILOXANE COPOLYMER COMPOSITIONS AND ARTICLES FORMED THEREFROM

(75) Inventors: Katherine Glasgow, Evansville, IN (US); Jan-Pleun Lens, Breda (NL); Brian Mullen, Evansville, IN (US); Vandita Pai-Paranjape, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 852 days.

(21) Appl. No.: 11/537,056

(22) Filed: Sep. 29, 2006

(65) Prior Publication Data

US 2008/0081884 A1 Apr. 3, 2008

(51) Int. Cl.
C08L 69/00 (2006.01)
C08G 81/00 (2006.01)
(52) U.S. Cl. ........................... 525/464; 525/469
(58) Field of Classification Search .................. None
See application file for complete search history.

(56) References Cited

U.S. PATENT DOCUMENTS

| | | | |
|---|---|---|---|
| 4,900,785 A | 2/1990 | Leitz et al. | |
| 4,918,149 A | 4/1990 | Clagett et al. | |
| 5,025,055 A | 6/1991 | Hamersma et al. | |
| 5,100,960 A * | 3/1992 | Grigo et al. ............... | 525/92 A |
| 5,455,310 A | 10/1995 | Hoover et al. | |
| 5,530,083 A | 6/1996 | Phelps et al. | |
| 6,072,011 A | 6/2000 | Hoover | |
| 6,492,481 B1 | 12/2002 | Davis et al. | |
| 6,537,636 B1 * | 3/2003 | Wisnudel et al. ........... | 428/64.1 |
| 6,538,065 B1 | 3/2003 | Suriano et al. | |
| 6,559,270 B1 | 5/2003 | Siclovan et al. | |
| 6,780,956 B2 | 8/2004 | Davis | |
| 6,833,422 B2 | 12/2004 | Silva et al. | |
| 6,861,482 B2 | 3/2005 | Brunell et al. | |
| 6,870,013 B2 | 3/2005 | Silva et al. | |
| 2003/0065122 A1 | 4/2003 | Davis | |
| 2004/0039145 A1 | 2/2004 | Silva et al. | |
| 2004/0220330 A1 | 11/2004 | DeRudder et al. | |
| 2005/0032988 A1 | 2/2005 | Silva et al. | |
| 2005/0137310 A1 | 6/2005 | Gupta et al. | |
| 2005/0261396 A1 * | 11/2005 | Ermi et al. .................. | 523/217 |
| 2006/0002814 A1 | 1/2006 | Chatterjee et al. | |
| 2006/0074156 A1 | 4/2006 | Ebeling et al. | |
| 2008/0015289 A1 * | 1/2008 | Siripurapu .................. | 524/115 |
| 2008/0015290 A1 * | 1/2008 | Siripurapu et al. .......... | 524/115 |
| 2008/0015291 A1 * | 1/2008 | Siripurapu et al. .......... | 524/115 |
| 2008/0015292 A1 * | 1/2008 | Lens et al. .................. | 524/115 |
| 2008/0081884 A1 * | 4/2008 | Glasgow et al. ............. | 525/464 |

FOREIGN PATENT DOCUMENTS

EP   537577 A1   4/1993

| | | | |
|---|---|---|---|
| EP | 0500131 B1 | | 10/2001 |
| EP | 0524731 B1 | | 3/2002 |
| EP | 1757634 | | 2/2007 |
| JP | 2005154663 | * | 6/2005 |
| WO | 2004076512 | | 9/2004 |
| WO | 2004076512 A2 | | 9/2004 |
| WO | 2005055236 | | 6/2005 |
| WO | 2005113638 | | 12/2005 |

OTHER PUBLICATIONS

ASTM D 1003-00, "Standard Test Method for Haze and Luminous Transmittance of Transparent Plastics", pp. 1-6.
ASTM D 3763-02, "Standard Test Method for High Speed Puncture Properties of Plastics Using Load and Displacement Sensors" pp. 1-10.
Written Opinion for International Search Report PCT/US2007/073642, Mailed Feb. 27, 2008, 6 pages.
International Search Report PCT/US2007/073642, Mailed Feb. 27, 2008, 6 pages.

* cited by examiner

*Primary Examiner*—David Buttner

(57) ABSTRACT

A thermoplastic composition comprises a copolycarbonate comprising 25 to 100 mole percent of a first carbonate unit derived from a dihydroxy aromatic compound having the formula

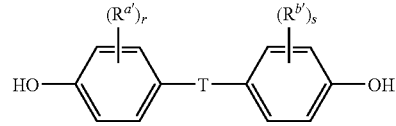

wherein $R^{a'}$ and $R^{b'}$ are $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4, and r and s are 1 to 4; and 0 to 75 mole percent of a second carbonate unit, wherein the first carbonate unit and second carbonate unit are not identical; a polysiloxane-polycarbonate copolymer comprising 0.15 to 30 weight percent of a polysiloxane block comprising siloxane units of the formula

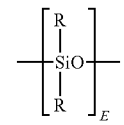

wherein E is on average of 4 to 60 units, and 70 to 99.85 weight percent of a third carbonate unit, wherein an article having a thickness of 3.2 mm and molded from the thermoplastic composition has a Dynatup total energy of greater than 50 Joules, as measured at a constant speed of 3.3 to 3.6 m/sec at 23° C. according to ASTM D3763-02. A method of making and articles prepared therefrom are also disclosed.

22 Claims, No Drawings

POLYCARBONATE-POLYSILOXANE COPOLYMER COMPOSITIONS AND ARTICLES FORMED THEREFROM

BACKGROUND

This disclosure relates to polycarbonates, and in particular to polycarbonate-polysiloxane copolymer blends with polycarbonates and uses thereof.

Polycarbonates are useful in the manufacture of articles and components for a wide range of applications, from automotive parts to medical devices. Polycarbonates having a high percentage of units derived from 1,1-bis(4-hydroxy-3-methylphenyl)cyclohexane (DMBPC) in particular have excellent attributes such as ammonia resistance, resistance to scratching, and water vapor and oxygen impermeability compared to other polycarbonates. At least in part because of these good barrier properties, such polycarbonates are useful in medical packaging applications. However, such polycarbonates are also brittle (of low ductility) compared to polycarbonates containing a high number of units derived from bisphenols such as bisphenol A. The addition of materials that can improve ductility, for example polydiorganosiloxane units, however, leads to increased haze in the compositions.

There accordingly remains a need in the art for polycarbonates that have improved ductility, together with other advantageous properties, such as oxygen impermeability, water vapor impermeability, scratch resistance, and/or improved transparency.

SUMMARY OF THE INVENTION

The above-described and other deficiencies of the art are met by a thermoplastic composition comprising a copolycarbonate comprising 25 to 100 mole percent of a first carbonate unit derived from a dihydroxy aromatic compound having the formula:

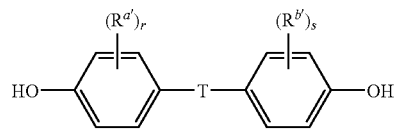

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4; and 0 to 75 mole percent of a second carbonate unit derived from a dihydroxy aromatic compound, wherein the first carbonate unit and second carbonate unit are not identical, and wherein the mole percentages of each of the first carbonate unit and the second carbonate unit are based on the total number of moles of first carbonate unit and second carbonate unit; a polysiloxane-polycarbonate copolymer comprising 0.15 to 30 weight percent of a polysiloxane block comprising siloxane units of the formula:

wherein E is on average of 4 to 60 units, and each occurrence of R is the same or different and is a $C_{1-13}$ monovalent organic group, and 70 to 99.85 weight percent of a third carbonate unit derived from a dihydroxy aromatic compound, wherein the weight percentages of each of the polysiloxane block and the third carbonate unit are based on the total weight of polysiloxane block and third carbonate unit, wherein an article having a thickness of 3.2 mm and molded from the thermoplastic composition has a Dynatup total energy of greater than 50 Joules, as measured at a constant speed of 3.3 to 3.6 m/s at 23° C. according to ASTM D3763-02.

In another embodiment, a method of preparing a thermoplastic composition comprising melt blending a copolycarbonate comprising 25 to 100 mole percent of a first carbonate unit derived from a dihydroxy aromatic compound having the formula:

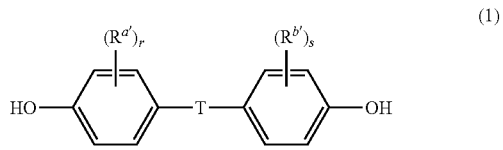

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4; and 0 to 75 mole percent of a second carbonate unit derived from a dihydroxy aromatic compound wherein the first carbonate unit and second carbonate unit are not identical, and wherein the mole percentages of each of the first carbonate unit and the second carbonate unit are based on the total number of moles of first carbonate unit and second carbonate unit; with a polysiloxane-polycarbonate comprising 0.15 to 30 weight percent of a polysiloxane block comprising siloxane units of the formula:

wherein E is on average 4 to 60, and each occurrence of R is the same or different and is a $C_{1-13}$ monovalent organic group, and 70 to 99.85 weight percent of a third carbonate unit derived from a dihydroxy aromatic compound wherein the weight percentages of each of the polysiloxane block and the third carbonate unit are based on the total weight of polysiloxane block and third carbonate unit, wherein an article having a thickness of 3.2 mm and molded from the thermoplastic composition has a Dynatup total energy of greater than 50 Joules, as measured at a constant speed of 3.3 to 3.6 m/s at 23° C. according to ASTM D3763-02.

In yet another embodiment, an article comprises the above-described polycarbonate copolymer.

The above described and other features are exemplified by the following detailed description.

DETAILED DESCRIPTION OF THE INVENTION

Described herein is a thermoplastic composition derived from a polycarbonate copolymer (also referred to as a "copolycarbonate") derived from an alkyl-substituted bisphenol and a bisphenol without alkyl substituents on the phenols, and a polysiloxane-polycarbonate copolymer, derived from a polysiloxane-containing diol and a bisphenol. The thermoplastic compositions have improved ductility as well as other advantageous properties, such as impact strength, scratch resistance, oxygen and water vapor permeability, and haze and/or transparency. The copolycarbonates are particularly useful in medical applications.

Polycarbonates, as used herein, include polymers having carbonate linkages. In particular, polycarbonates including the copolycarbonates described herein have repeating structural carbonate units of the formula (3):

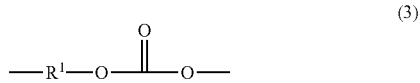
(3)

wherein the $R^1$ groups are derived from dihydroxy aromatic compounds as described in detail below.

At least a portion of the $R^1$ groups of formula (4) are derived from an alkyl-substituted bisphenol of the formula (1):

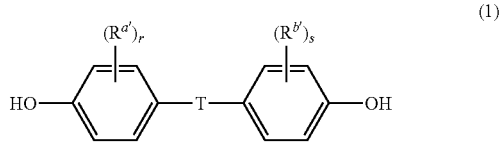
(1)

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4. Each of the foregoing groups are unsubstituted or substituted with an alkyl, aryl, alkoxy, or aryloxy group (up to the indicated total number of carbon atoms), halogen, —CN, —NO₂, —SH, or —OH. Combinations of the substituents can be present.

In one embodiment, T is a $C_{5-16}$ cycloalkylidene that is unsubstituted or substituted with one or more of alkyl, aryl, alkoxy, or aryloxy group (up to the indicated total number of carbon atoms), halogen, —CN, —NO₂, —SH, or —OH. In another embodiment, T is a $C_{5-12}$ cyclopentylidene or cyclohexylidene that is unsubstituted or substituted with one or more alkyl groups.

Specifically, the units of formula (1) can be cycloalkylidene-bridged, alkyl-substituted bisphenols of formula (1a):

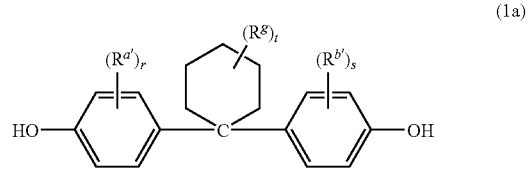
(1a)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. It will be understood that hydrogen fills each valency when r is 0, s is 0, and t is 0. In a specific embodiment, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 1 or 2, and t is 0 to 5, specifically 0 to 3. Specifically, at least one of $R^{a'}$ and/or $R^{b'}$ are methyl, and are disposed meta to the bridging group. In another embodiment, the cyclohexylidene-bridged, alkyl-substituted bisphenol is 1,1-bis(4-hydroxy-3-methylphenyl)cyclohexane ("DMBPC"). In another embodiment, cycloalkylidene-bridged, alkyl-substituted bisphenol is the reaction product of two moles of cresol with one mole of a hydrogenated isophorone (1,1,3-trimethyl-3-cyclohexane-5-one).

The copolycarbonate further comprises units derived from a bisphenol that differs from the bisphenol of formula (1), and, of course, the diol containing a polysiloxane. The bisphenol is of the formula (4):

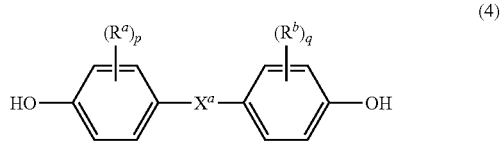
(4)

wherein $R^a$ and $R^b$ each represent a halogen and can be the same or different; p and q are each independently integers of 0 to 4. It will be understood that when p and/or q is 0, the valency will be filled by a hydrogen atom. Also in formula (4), $X^a$ represents a bridging group connecting the two hydroxy-substituted aromatic groups (i.e., hydroxy-substituted $C_6$ arylene groups such as, for example, phenol or o-cresol), where the bridging group and the hydroxy substituent of the $C_6$ arylene group are disposed para to each other on the $C_6$ arylene group. In an embodiment, the bridging group $X^a$ is a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In an embodiment, $X^a$ is one of the groups of formula (5):

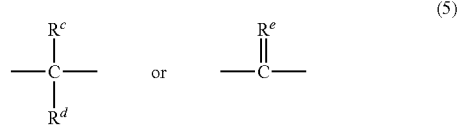
(5)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylene group or a $C_{6-16}$ arylene group.

In still another embodiment, $X^a$ is an acyclic $C_{1-18}$ alkylidene group, a $C_{3-18}$ cycloalkylidene group (except for a cyclohexylidene), or a $C_{2-18}$ heterocycloalkylidene group, i.e., a cycloalkylidene group having up to three heteroatoms in the ring, wherein the heteroatoms include —O—, —S—, or —N(Z)—, where Z is hydrogen, halogen, hydroxy, $C_{1-12}$ alkyl, $C_{1-12}$ alkoxy, or $C_{1-12}$ acyl.

$X^a$ can be a substituted $C_{3-18}$ cycloalkylidene of the formula (6):

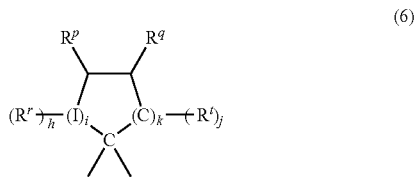
(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 0 to 2, i is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

In a specific embodiment, a bisphenol that differs from the bisphenol of formula (1) and is copolymerized therewith to provide the copolycarbonate is derived from a dihydroxy aromatic compound having the formula (4a):

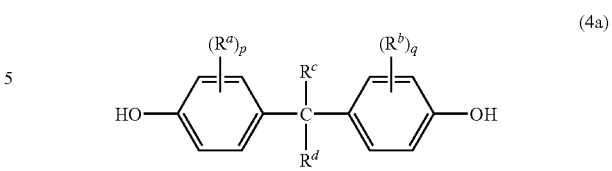
(4a)

wherein $R^a$ and $R^b$ are each independently halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; and p and q are each independently 0 to 4.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3methylphenyl)cyclohexane 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4- hydroxyphenyl)fluorene. Combinations comprising at least one of the foregoing dihydroxy aromatic compounds can also be used.

Small amounts of other types of diols can be present in the copolycarbonate. For example, a small portion of $R^1$ can be derived from a dihydroxy aromatic compound of formula (7):

alkyl-substituted bisphenol carbonate units are of formula (1a).

In an exemplary embodiment, the alkyl-substituted bisphenol polycarbonate is a copolymer comprising carbonate units derived from DMBPC and bisphenol A, and has the formula (8):

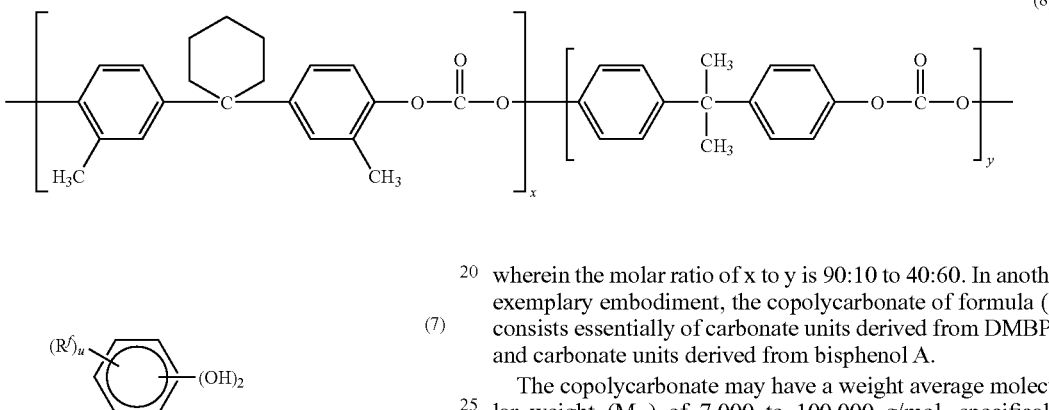

(8)

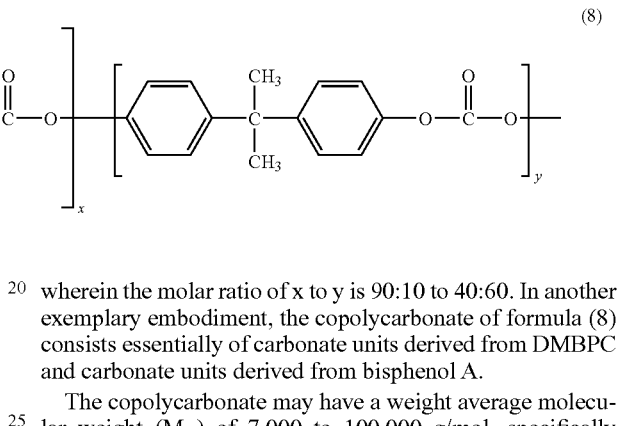

(7)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (7) in which the —OH groups are substituted meta to one another, and wherein $R^f$ and u are as described above, are also generally referred to herein as resorcinols. Examples of compounds that can be represented by the formula (7) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

In an embodiment, the copolycarbonate comprises alkyl-substituted bisphenol carbonate units derived from formula (1) in an amount of 25 to 100 mole percent (mol %), specifically 30 to 100 mol %, more specifically 40 to 90 mol %, and still more specifically 50 to 80 mol %, based on the total mole percentage of carbonate units in the copolycarbonate. Also in an embodiment, the copolycarbonate comprises the non-identical carbonate units in an amount of 0 to 75 mol %, specifically 0 to 70 mol %, more specifically 10 to 60 mol %, and still more specifically 20 to 50 mol %, in which the sum of the mole percentages of the alkyl-substituted bisphenol carbonate unit derived from formula (1) and the non-identical carbonate unit is 100 mol %. In an embodiment, the copolycarbonate consists essentially of alkyl-substituted bisphenol carbonate units derived from formula (1), or alkyl-substituted bisphenol carbonate units of formula (1) and non-identical carbonate units, where the sum of the mole percentages of alkyl-substituted bisphenol carbonate units and the non-identical carbonate units is 100 mol %. In an embodiment, the wherein the molar ratio of x to y is 90:10 to 40:60. In another exemplary embodiment, the copolycarbonate of formula (8) consists essentially of carbonate units derived from DMBPC and carbonate units derived from bisphenol A.

The copolycarbonate may have a weight average molecular weight ($M_w$) of 7,000 to 100,000 g/mol, specifically 10,000 to 80,000 g/mol, and more specifically 15,000 to 75,000 g/mol as measured by gel permeation chromatography (GPC) using a crosslinked styrene-divinyl benzene column, as calibrated with polycarbonate standards. GPC samples are prepared at a concentration of about 1 mg/ml, and are eluted in methylene chloride or chloroform as a solvent at a flow rate of about 1.5 ml/min.

The copolycarbonates can further be manufactured to be substantially transparent. In this case, the copolycarbonates can have a haze of less than about 5%, specifically less than about 3% as measured using 3.2 mm thick plaques according to ASTM-D 1003-00.

The copolycarbonate has flow properties described by the melt volume flow rate (often abbreviated MVR), which measures the rate of extrusion of a thermoplastic polymer through an orifice at a prescribed temperature and load. Polycarbonates useful herein may have an MVR, measured at 300° C. under a load of 1.2 kg according to ASTM D1238-04, of 0.5 to 40 cubic centimeters per 10 minutes (cc/10 min), specifically 1 to 35 cc/10 min, and more specifically 2 to 30 cc/min. In an embodiment, the copolycarbonate can have an MVR of less than or equal to 40 cc/10 min as measured at 300° C. under a load of 1.2 kg according to ASTM D1238-04. In another embodiment, the copolycarbonate can have an MVR of less than or equal to 10 cc/10 min as measured at 300° C. under a load of 1.2 kg according to ASTM D1238-04. Combinations of polycarbonates of different flow properties may be used to achieve the overall desired flow property.

In an embodiment, the copolycarbonate is present in the thermoplastic composition in an amount of 25 to 95 weight percent (wt %), specifically 30 to 90 wt %, more specifically 40 to 85 wt %, based on the total weight of copolycarbonate, polysiloxane-polycarbonate, and any additional polymer. The use of these particular polymeric components can provide specific, useful compositions having the desired properties. Therefore, in an embodiment, the thermoplastic composition consists essentially of the copolycarbonate, the polysiloxane-polycarbonate, and optionally an additional polymer, wherein these polymers are not identical.

The thermoplastic composition also comprises a polysiloxane-polycarbonate, itself comprising carbonate units of formula (3) and polysiloxane blocks derived from a diol that contains diorganosiloxane units blocks of formula (2):

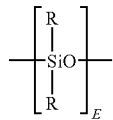

(2)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent copolycarbonate is desired, R does not contain any halogen. Combinations of the foregoing R groups can be used in the same copolycarbonate.

The value of E in formula (2) can vary widely depending on the type and relative amount of each of the different units in the copolycarbonate, the desired properties of the copolycarbonate, and like considerations. Generally, E can have an average value of 2 to about 1,000, specifically about 2 to about 500, more specifically about 2 to about 100. In an embodiment, E has an average value of about 4 to about 90, specifically about 5 to about 80, and more specifically about 10 to about 75. In a specific embodiment, E is on average 4 to 60, specifically 4 to 30. In another specific embodiment, E is on average 30 to 70, specifically 40 to 60. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (9):

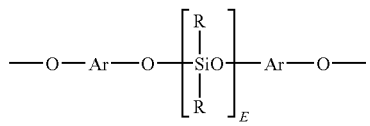

(9)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (9) can be derived from a $C_6$-$C_{30}$ dihydroxyarylene compound, for example a dihydroxyarylene compound of formula (3) or (7) described in detail below. Combinations comprising at least one of the foregoing dihydroxyarylene compounds can also be used. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl) propane, or a combination comprising at least one of the foregoing dihydroxy compounds.

Polycarbonates comprising such units can be derived from the corresponding dihydroxy compound of formula (9a):

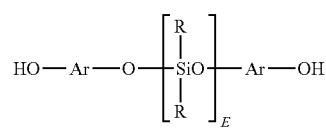

(9a)

wherein Ar and E are as described above. Compounds of formula (9a) can be obtained by the reaction of a dihydroxyarylene compound with, for example, an alpha, omega-bis-acetoxy-polydiorganosiloxane oligomer under phase transfer conditions. Compounds of formula (9a) can also be obtained from the condensation product of a dihydroxyarylene compound, with, for example, an alpha, omega bis-chloro-polydimethylsiloxane oligomer in the presence of an acid scavenger.

In another embodiment, polydiorganosiloxane blocks comprises units of formula (10):

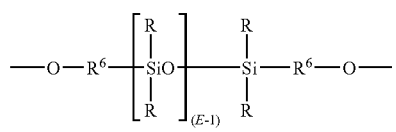

(10)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (10) are derived from the corresponding dihydroxy compound (10a):

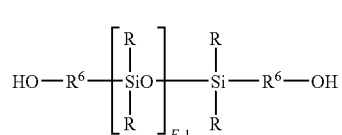

(10a)

wherein R and E and $R^6$ are as described for formula (10).

In a specific embodiment, the polydiorganosiloxane blocks are provided by repeating structural units of formula (11):

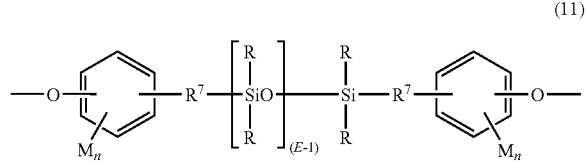

(11)

wherein R and E are as defined above. $R^7$ in formula (11) is a divalent $C_2$-$C_8$ aliphatic group. Each M in formula (11) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^7$ is a divalent $C_1$-$C_3$ aliphatic group, and R is methyl.

Copolycarbonates comprising units of formula (11) can be derived from the corresponding dihydroxy polydiorganosiloxane (11a):

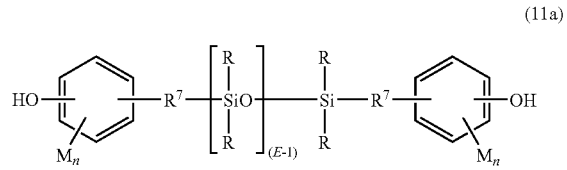

(11a)

wherein each of R, E, M, $R^7$, and n are as described above. Such dihydroxy polysiloxanes can be made by effecting a platinum-catalyzed addition between a siloxane hydride of formula (12):

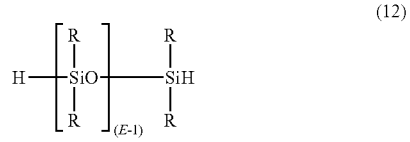

(12)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In an embodiment, the polysiloxane-polycarbonate comprises polysiloxane blocks derived from the corresponding dihydroxy polysiloxane compound are present in an amount of 0.15 to 30 wt %, specifically 0.5 to 25 wt %, and more specifically 1 to 20 wt % based on the total weight of polysiloxane blocks and carbonate units. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

The polysiloxane-polycarbonate used in the thermoplastic composition further comprises a carbonate unit of formula (3) derived from a dihydroxy aromatic compound of formula (4). In an exemplary embodiment, the dihydroxy aromatic compound is bisphenol A. In an embodiment, the carbonate units comprising the copolycarbonate are present in an amount of 70 to 99.85 wt %, specifically 75 to 99.5, and more specifically 80 to 99 wt % based on the total weight of polysiloxane blocks and carbonate units. In a specific embodiment, the carbonate units are present in an amount of 90 to 99 wt %, specifically 91 to 98 wt %, and more specifically 92 to 97 wt %, based on the total weight of polysiloxane blocks and carbonate units.

In an exemplary embodiment, the thermoplastic composition comprises a polysiloxane-polycarbonate having the formula (13):

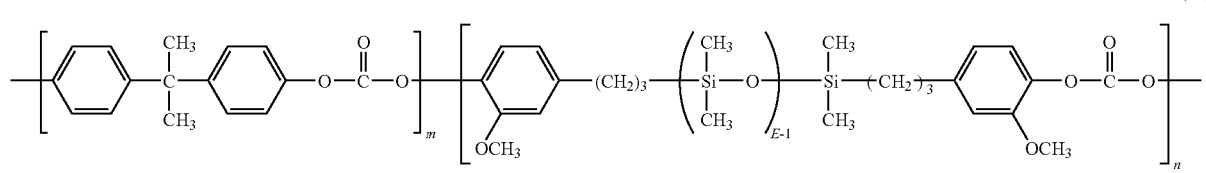

(13)

wherein E is on average 4 to 60, and the weight ratio of m to n is 99:1 to 90:10.

The polycarbonates can be manufactured using an interfacial phase transfer process or melt polymerization as is known. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst salt, under controlled pH conditions, e.g., about 8 to about 10. Suitable phase transfer catalysts include compounds of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In one embodiment, the process uses phosgene as a carbonate precursor.

The water-immiscible solvent used to provide a biphasic solution includes, for example, methylene chloride, 1,2-dichloroethane, chlorobenzene, toluene, and the like.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Suitable monocarboxylic acid chlorides include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are monochloroformates including monocyclic monochloroformates, such as phenyl chloroformate, $C_1$-$C_{22}$ alkyl-substituted phenyl chloroformate, p-cumyl phenyl chloroformate, toluene chloroformate, and combinations thereof.

Various types of polycarbonates with branching groups are contemplated as being useful, provided that such branching does not significantly adversely affect desired properties of the compositions. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

In addition to the copolycarbonates described above, combinations of the copolycarbonate with other thermoplastic polymers, for example homopolycarbonates, other polycarbonate copolymers comprising different $R^1$ moieties in the carbonate units, polyester carbonates, also known as a polyester-polycarbonates, and polyesters, or combination of these, provided the additional polymer is not identical to the copolycarbonate or the polysiloxane-polycarbonate. When used, the additional polymer can be present in the thermoplastic composition in an amount of 0 to 30 wt %, specifically 1 to 20 wt %, more specifically 2 to 15 wt %, based on the total weight of copolycarbonate, polysiloxane-polycarbonate, and the additional polymer. The use of these particular polymeric components can provide specific, useful compositions having the desired properties. Therefore, in an embodiment, the thermoplastic composition consists essentially of the copolycarbonate, polysiloxane-polycarbonate, and the additional polymer. In an exemplary embodiment, an additional polymer can be a linear homopolycarbonate polymer derived from bisphenol A.

Homopolycarbonates and copolycarbonates having carbonate units that are solvent and base resistant, and derived from dihydroxyaromatic compounds such as, for example, DMBPC, have been found to have excellent barrier properties (e.g., oxygen permeability, water permeability, etc.). However, it has been found that the use of such copolymers to prepare articles that have to withstand physical impacts, such as medical devices, is impractical due to the high brittleness of the copolycarbonates.

Surprisingly, it has been found that a thermoplastic composition comprising a combination of a copolycarbonate comprising carbonate units that are solvent and base resistant and derived from dihydroxyaromatic compounds such as, for example, DMBPC, can have dramatically improved ductility when blended with a polysiloxane-polycarbonate. The copolycarbonate blend with polysiloxane-polycarbonate further retains the desired barrier properties and transparency, having excellent moisture resistance and low haze of less than about 25%.

The thermoplastic composition has an MVR, measured at 300° C. under a load of 1.2 kg according to ASTM D1238-04, of 0.5 to 40 cubic centimeters per 10 minutes (cc/10 min). In an embodiment, the thermoplastic composition can have an MVR of less than or equal to 39 cc/10 min, specifically less than or equal to 30 cc/10 min, more specifically less than or equal to 20 cc/10 min, and still more specifically less than or equal to 15 cc/10 min, as measured at 300° C. under a load of 1.2 kg according to ASTM D1238-04. The foregoing MVR values for the thermoplastic composition can be obtained with or without the use of a redistribution catalyst during the formation of the thermoplastic composition, and further may be achieved using a mixture of components (i.e., the copolycarbonate, the polysiloxane-polycarbonate, and any additional polymer and/or additive) to provide the overall desired flow property.

The thermoplastic composition has improved ductility as shown in the ductile-brittle transition. In an embodiment, an article having a thickness of 3.2 mm and molded from the thermoplastic composition has a Dynatup total energy greater than 50 Joules (J), specifically greater than 53 J, and more specifically greater than 56 J, as measured at a constant speed of 3.3 to 3.6 m/sec at 23° C. according to ASTM D3763-02. In another embodiment, an article having a thickness of 3.2 mm and molded from the thermoplastic composition has Dynatup total energy of greater than 50 Joules (J), specifically greater than 53 J, and more specifically greater than 56 J, as measured at a constant speed of 3.3 to 3.6 m/sec at −20° C. according to ASTM D3763-02. In another embodiment, an article having a thickness of 3.2 mm and molded from the thermoplastic composition has a Dynatup total energy of greater than 40 Joules (J), specifically greater than 43 J, and more specifically greater than 46 J, as measured at a constant speed of 3.3 to 3.6 m/sec at −30° C. according to ASTM D3763-02.

In addition, articles comprising the thermoplastic composition have improved ductility as shown in the ductile-brittle transition. In an embodiment, greater than or equal to 50%, specifically greater than or equal to 60%, and more specifically greater than or equal to 70% of a statistically significant number of articles having a thickness of 3.2 mm and molded from the thermoplastic composition are ductile when measured at a constant speed of 3.3 to 3.6 m/sec at 23° C. according to ASTM D3763-02. In another embodiment, greater than or equal to 50%, specifically greater than or equal to 60%, and more specifically greater than or equal to 70% of a statistically significant number of articles having a thickness of 3.2 mm and molded from the thermoplastic composition are ductile when measured at a constant speed of 3.3 to 3.6 m/sec at −20° C. according to ASTM D3763-02. In another embodiment, greater than or equal to 50%, specifically greater than or equal to 60%, and more specifically greater than or equal to 70% of a statistically significant number of articles having a thickness of 3.2 mm and molded from the thermoplastic composition are ductile when measured at a constant speed of 3.3 to 3.6 m/sec at −30° C. according to ASTM D3763-02.

The thermoplastic composition has a Notched Izod Impact (NII) strength of 15 to 40 Joules per meter (J/m), specifically 20 to 35 J/m, when measured at 23° C. according to ASTM D256-04.

The thermoplastic composition can further be substantially transparent, having a low haze. Thus, the thermoplastic composition desirably has a haze of less than about 25%, specifically less than about 20%, more specifically less than about 10, and still more specifically less than about 5%, as measured using 3.2±0.12 mm thick plaques according to ASTM-D1003-00.

In addition to the copolycarbonate, the polysiloxane-polycarbonate, and any additional polymer, the thermoplastic composition can further comprise additives, provided that any additives included in the thermoplastic composition do not significantly adversely affect the desired properties of the thermoplastic composition.

For example, the thermoplastic composition can further include impact modifier(s), with the proviso that the additives are selected so as to not significantly adversely affect the desired properties of the thermoplastic composition. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 parts by weight, based on 100 parts by weight of copolycarbonate, polysiloxane-polycarbonate, and any additional polymer.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 20 parts by weight, based on 100 parts by weight of copolycarbonate, polysiloxane-polycarbonate, and any additional polymer.

Exemplary antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.1 parts by weight, based on 100 parts by weight of copolycarbonate, polysiloxane-polycarbonate, and any additional polymer.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.1 parts by weight, based on 100 parts by weight of copolycarbonate, polysiloxane-polycarbonate, and any additional polymer.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 5 parts by weight, based on 100 parts by weight of copolycarbonate, polysiloxane-polycarbonate, and any additional polymer.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to about 100 nanometers; or the like, or combinations comprising at least one of the foregoing UV absorbers. UV absorbers are generally used in amounts of about 0.01 to about 5 parts by weight, based on 100 parts by weight of copolycarbonate, polysiloxane-polycarbonate, and any additional polymer.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of about 0.1 to about 1 part by weight, based on 100 parts by weight of copolycarbonate, polysiloxane-polycarbonate, and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321

(Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of about 0.05 to about 0.5 parts by weight, based on 100 parts by weight of copolycarbonate, polysiloxane-polycarbonate, and any additional polymer.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.001 to about 3 parts by weight, based on 100 parts by weight of copolycarbonate, polysiloxane-polycarbonate, and any additional polymer.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of copolycarbonate, polysiloxane-polycarbonate, and any additional polymer.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of copolycarbonate, polysiloxane-polycarbonate, and any additional polymer.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

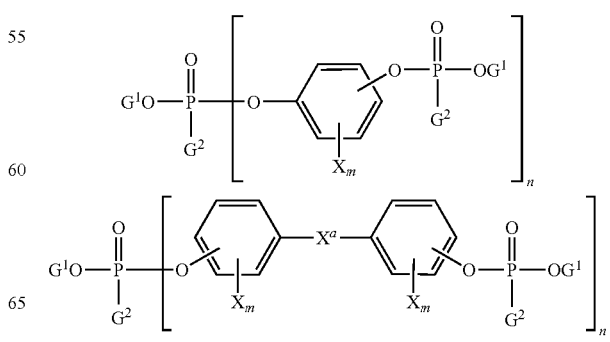

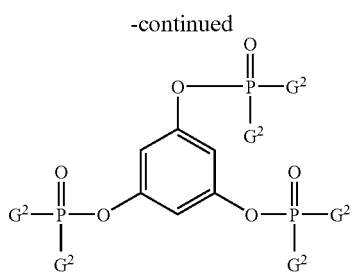

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 0.1 to about 30 parts by weight, more specifically about 1 to about 20 parts by weight, based on 100 parts by weight of copolycarbonate, polysiloxane-polycarbonate, and any additional polymer.

Halogenated materials can also be used as flame retardants, for example halogenated compounds and resins of formula (14):

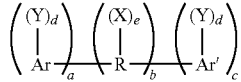

(14)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (14) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of about 1 to about 25 parts by weight, more specifically about 2 to about 20 parts by weight, based on 100 parts by weight of copolycarbonate, polysiloxane-polycarbonate, and any additional polymer.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-6}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 10 parts by weight, more specifically about 0.02 to about 1 parts by weight, based on 100 parts by weight of copolycarbonate, polysiloxane-polycarbonate, and any additional polymer.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of copolycarbonate, polysiloxane-polycarbonate, and any additional polymer.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight based on 100 parts by weight of copolycarbonate, polysiloxane-polycarbonate, and any additional polymer.

Thermoplastic compositions comprising the copolycarbonate can be manufactured by various methods. For example, powdered copolycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Addition of small amounts of transesterification catalysts, also known as redistribution catalysts, typically used to redistribute the molecular weight distribution of polycarbonates by catalyzing chain scission reactions, can be added as desired during extrusion to assist in homogenizing the thermoplastic composition. Suitable transesterification catalysts are numerous and include a wide variety of bases and Lewis acids. Specific examples of some transesterification catalysts, i.e. those which produce lower molecular weight species, efficient transesterification, and low residual monomer, include tetraorganophosphonium hydroxides, tetraorganophosphonium carbonates, tetraorganophosphonium acetate, tetraorganophosphonium phenolates, tetraorganophosphonium bisphenolates, tetraalkyl ammonium hydroxides, tetraalkyl ammonium carbonates, tetraalkyl ammonium phosphites, tetraalkyl ammonium acetates, tetraalkyl ammonium phenolates, tetraalkyl ammonium bisphenolates, and a mixture comprising one or more of these. More specifically, the transesterification catalyst may be a tetra $C_1$-$C_{10}$ alkyl phosphonium hydroxide that is decomposable under reaction conditions to very low levels of the active catalytic species. Most specifically, the catalyst may be tetrabutylphosphonium hydroxide (TBPH).

Transesterification catalysts may be present in amounts of greater than 0.002% to 0.1%, or from greater than 20 to 1,000 ppm of the total weight of the polymer blend. In an embodiment, the amount of transesterification catalyst present in the polyester-polycarbonate and polycarbonate blend is 20 to 500 ppm, specifically 100 to 500 ppm, more specifically 150 to 400 ppm of the total weight of the copolycarbonate and polysiloxane-polycarbonate. In a specific embodiment, the transesterification catalyst is tetrabutylphosphonium hydroxide (TBPH). The transesterification catalyst is present in sufficient amount to catalyze the reaction to a sufficient amount to produce a transparent reaction product, but is not present in an excessive amount, because an excess of catalyst may produce an opaque reaction product and/or a non-weatherable reaction product. The optimal catalyst level will vary depending on the particular catalyst and can be determined by testing.

Shaped, formed, or molded articles comprising the copolycarbonate compositions are also provided. The polycarbonate compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions can be used for medical applications, such as syringe barrels, sample containers, medicament containers, plastic vials, blood housings, filter housings, membrane housings, plungers, and the like.

The copolycarbonates are further illustrated by the following non-limiting examples.

The thermoplastic compositions were prepared by compounding on either a Werner and Pfleiderer 25 mm intermeshing twin screw extruder at 300 rpm with barrel temperatures of 260 to 315° C., with a vacuum port located near die face unless otherwise noted. The compositions were molded after drying at 110° C. for 4 hrs on either a 260-ton (236 metric ton) Van Dorn molding machine operating at about 250 to 310° C. with a mold temperature of 82° C. Depending on part geometry, the compositions were compounded and molded at a temperature of 250 to 330° C. unless otherwise noted. It will be recognized by one skilled in the art that the method is not limited to these temperatures.

Notched Izod Impact strength was measured according to ASTM D256-04 on 3.2 millimeter thick test bars at 23° C. and is reported in Joules per meter (J/m). Melt Volume Rate, MVR, was tested according to ASTM 1238-04 at 300° C. for 6 minutes using a weight of 1.2 kilograms. Ductility was measured according to ASTM D3763-02 on 3.2 mm thick test plaques at a constant speed of 3.3 to 3.6 m/sec and at temperatures of 23° C., −20° C., and −30° C., where the Dynatup total energy is reported in joules (J), and where the ductility is reported as a percentage of the total number of samples in a test set that are ductile when measured a the given temperature (5 samples per thermoplastic compound test set unless otherwise indicated). Molecular weight is determined using gel permeation chromatography, and a crosslinked styrene-divinylbenzene test column operating at a flow rate of 0.5-1.0 ml/min, a sample concentration of 1 mg/ml, and calibrated using polystyrene standards.

Thermoplastic compositions for the examples and comparative examples were prepared using the components shown in Table 1. Polymers referred to in Table 1 consist of monomeric units derived from Structure I (DMBPC), Structure II (BPA), or Structure III (Eugenol-capped polydimethylsiloxane, $E_{avg}=45$) as indicated.

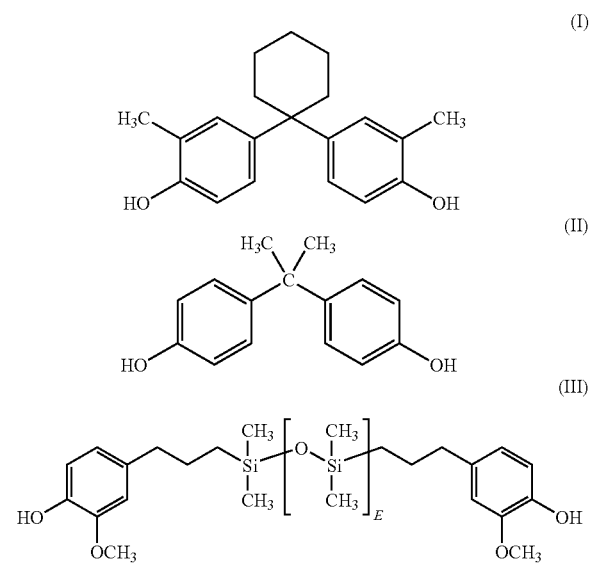

The thermoplastic compositions for testing were formulated using the components listed in Table 1.

TABLE 1

| Name | Description | Manufacturer |
|---|---|---|
| PC | Bisphenol-A polycarbonate, Mw = 30K g/mol | GE Plastics |
| PC-Si | Poly((Bisphenol-A carbonate)-co-(eugenol-capped polydimethylsiloxane carbonate)), Mw = 23K g/mol, 6 wt % III) | GE Plastics |
| PC-I-50 | Poly((Bis-dimethylphenol cyclohexylidene)-co-(bisphenol-A-carbonate)), Mw = 23K g/mol (50 wt % I) | GE Plastics |
| PC-I-86 | Poly((Bis-dimethylphenol cyclohexylidene)-co-(bisphenol-A-carbonate)), Mw = 22K g/mol (86 wt % I) | GE Plastics |
| PETS | Pentaerythritol Tetrastearate (plasticizer/mold release agent) | FACI, Farasco-Genova, Italy |
| I-168 | IRGAFOS ® 168 Antioxidant (Tris-(2,6-di-tert-butylphenyl)phosphite | Ciba Specialty Chemicals |
| TBPH | Tetrabutylphosphonium hydroxide, 40 wt % in water | Sachem, Inc. |

Examples 1-8 and Comparative Examples 1-3 were formulated as described in Table 2 using 100 parts by weight of mixtures of the above resins, 0 to 0.4 parts per hundred (phr) PETS, and 0 to 0.10 phr I-168. The resins and additives were formulated in a HENSCHEL-Mixer® tumbler for 5 to 10 minutes. Then, the formulations were extruded on a twin-screw extruder and pelletized. The pellets were injection molded into samples for analysis. Table 2 displays the resin formulations and the corresponding properties of the pellets and injection-molded parts. All formulations were amorphous and transparent to the naked eye.

TABLE 2

| Entry | PC-I-50 (wt %) | PC-I-86 (wt %) | PC-Si (wt %) | MVR, 300° C./1.2 Kg Load (cm³/10 min)) | 23° C. NI Impact Strength (J/m) | 23° C. Dynatup Total Energy (J) | 23° C. Dynatup Ductility (% of samples) |
|---|---|---|---|---|---|---|---|
| Ex. 1[a] | 0 | 82.3 | 17.7 | 9.9 | 26.7 | 81.5 | 80 |
| Ex. 2[a] | 0 | 29.5 | 70.5 | 11 | 640.8 | 83.6 | 100 |
| Ex. 3[a] | 0 | 58.8 | 41.2 | 11.4 | 42.7 | 73.7 | 60 |

TABLE 2-continued

| Entry | PC-I-50 (wt %) | PC-I-86 (wt %) | PC-Si (wt %) | MVR, 300° C./1.2 Kg Load (cm³/10 min)) | 23° C. NI Impact Strength (J/m) | 23° C. Dynatup Total Energy (J) | 23° C. Dynatup Ductility (% of samples) |
|---|---|---|---|---|---|---|---|
| Ex. 4[b] | 0 | 40 | 60 | 12 | 32.0 | 62.9 | 100 |
| Ex. 5[b] | 0 | 60 | 40 | 13.3 | 21.4 | 61.1 | 60 |
| Comp. Ex. 1[b] | 0 | 80 | 20 | 13.9 | 16.0 | 2.5 | 0 |
| Ex. 6[c] | 70 | 0 | 30 | 18.3 | 10.7 | N/A | N/A |
| Ex. 7[c] | 80 | 0 | 20 | 19.5 | 21.4 | N/A | N/A |
| Ex. 8[c] | 90 | 0 | 10 | 21 | 10.7 | N/A | N/A |
| Comp. Ex. 2[b] | 0 | 0 | 100 | 9.4 | 731.6 | 51.8 | 100 |
| Comp. Ex. 3[b] | 0 | 100 | 0 | 14.3 | 21.4 | 2.6 | 0 |

[a]Formulation contained 0.06% I-168, no PETS.
[b]Formulation contained 0.1% I-168 and 0.4% PETS.
[c]Formulation did not contain I-168 or PETS.

The formulation derived from a copolymer consisting of I and II (PC—I-86) was inherently brittle (Comp. Ex. 3). However, blending the PC—I-86 resin with about 17 wt % PC—Si (Ex. 1) produced a more ductile polycarbonate material at MVR ranges below 13.3 cc/10 min. However, blends with an MVR of greater than or equal to 13.9 cc/10 min were brittle at 20 wt % PC—Si (Comp. Ex. 1). Also, it was discovered that in compositions having at least 70.5% PC—Si, the blend was ductile in the NI Impact test, which indicated that these materials are less sensitive to embrittlement by notching (Ex. 2).

Similarly, Examples 9-13 and Comparative Examples 4-7 were formulated as described in Table 3 using 100 parts by weight of mixtures of the resins in Table 1, 0 to 0.4 parts per hundred (phr) PETS, 0 to 0.10 phr I-168, and 200-400 ppm TBPH. The data is shown in Table 3.

TABLE 3

| Entry | PC-I-50 (wt %) | PC-I-86 (wt %) | PC-Si (wt %) | TBPH (ppm) | MVR, 1.2 Kg Load (cm³/10 min)) | 23° C. NI Impact Strength (J/m) | 23° C. Dynatup Total Energy | 23° C. Dynatup Ductility (% of samples) |
|---|---|---|---|---|---|---|---|---|
| Ex. 9[c] | 70 | 0 | 30 | 200 | 29.9 | 16.0 | N/A | N/A |
| Ex. 10[c] | 80 | 0 | 20 | 200 | 30.6 | 10.7 | N/A | N/A |
| Ex. 11[a] | 0 | 58.8 | 41.2 | 300 | 36.3 | 10.7 | 67.2 | 100 |
| Ex. 12[c] | 90 | 0 | 10 | 200 | 36.9 | 16.0 | N/A | N/A |
| Comp. Ex. 4[b] | 0 | 80 | 20 | 400 | 37.1 | 16.0 | 1.7 | 0 |
| Comp. Ex. 5[a] | 0 | 82.3 | 17.7 | 300 | 38.4 | 10.7 | 48.6 | 0 |
| Ex. 13[a] | 0 | 29.5 | 70.5 | 300 | 38.7 | 176.2 | 60.9 | 100 |
| Comp. Ex. 6[b] | 0 | 60 | 40 | 400 | 43.1 | 16.0 | 27.1 | 0 |
| Comp. Ex. 3[b] | 0 | 100 | 0 | 400 | 29.3 | 10.7 | 1.6 | 0 |

[a]Formulation contained 0.06% I-168, no PETS.
[b]Formulation contained 0.1% I-168 and 0.4% PETS.
[c]Formulation did not contain I-168 or PETS.

The transesterification catalyst, tetrabutylphosphonium hydroxide (TBPH), was used in the above compositions to increase the mixing of the copolymers derived from monomers I and II, and II and III. The MVR of the blends increased with the use of TBPH over the MVR of the blends without TBPH (Table 1). The impact performance of the compositions was also observed. Blends having 17 to 20% PC—Si were brittle when the MVR was increased using TBPH (Comp. Exs. 4 and 5). Blends with greater than 40% PC—Si were surprisingly ductile at MVR 36.3 cc/10 min (as shown by Ex. 11). However, the blends became brittle at an MVR of greater than 43 cc/10 min (Comp. Ex. 6). Example 13, with an MVR of 38.7 cc/10 min. was ductile as well.

The use of TBPH and the increase in melt flow did not negatively affect the ductility performance of materials derived from more than 40 wt % PC—Si in the blend, as long as the MVR was at or below 39 cc/10 min (Ex. 13). This provides a very useful range for processing materials. The use of the transesterification catalyst, TBPH, did not improve the haze of the materials, and actually, the use of TBPH made the blends slightly more hazy. All of the materials were transparent in nature with haze values less than 10%. In all cases, the TBPH increased the melt flow of the product, and in some cases this decreased the ductility due to the higher flow resin produced.

The low temperature ductility of some of the blends was also evaluated, as shown in Table 4.

TABLE 4

| Entry | 23° C. Dynatup Total Energy (J) | 23° C. Dynatup Ductility (% of samples) | −20° C. Dynatup Total Energy | −20° C. Dynatup Ductility (% of samples) | −30° C. Dynatup Total Energy | −30° C. Dynatup Ductility (% of samples) |
|---|---|---|---|---|---|---|
| Ex. 13 | 60.8 | 100 | 68.3 | 100 | 51.4 | 20 |
| Ex. 2 | 75.7 | 100 | 83.6 | 100 | 73.6 | 80 |
| Ex. 11 | 67.2 | 100 | 41.2 | 0 | 32.7 | 0 |
| Ex. 3 | 73.7 | 60 | 81.1 | 40 | 38.3 | 20 |
| Comp. Ex. 5 | 48.6 | 0 | 3.2 | 0 | 2.5 | 0 |
| Ex. 1 | 81.5 | 80 | 4.5 | 0 | 4.1 | 0 |

Examples 11 and 13, which contained a transesterfication catalyst (TBPH) still unexpectedly produced ductile materials. This result was not expected due to the high melt flow of these formulations. Examples 2 and 13 which, had more than 70% PC—Si, displayed robust ductility at −20° C. All other materials were less than 50% ductile at −20° C.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like.

The term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms; "cycloalkylene" refers to a non-aromatic divalent monocylic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

An "organic group" as used herein means a saturated or unsaturated (including aromatic) hydrocarbon having a total of the indicated number of carbon atoms and that can be unsubstituted or unsubstituted with one or more of halogen, nitrogen, sulfur, or oxygen, provided that such substituents do not significantly adversely affect the desired properties of the composition, for example transparency, heat resistance, or the like. Exemplary substituents include alkyl, alkenyl, akynyl, cycloalkyl, aryl, alkylaryl, arylalkyl, —NO2, SH, —CN, OH, halogen, alkoxy, aryloxy, acyl, alkoxy carbonyl, and amide groups.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising:
   a polycarbonate or copolycarbonate comprising:
      25 to 100 mole percent of a first carbonate unit derived from a dihydroxy aromatic compound having the formula

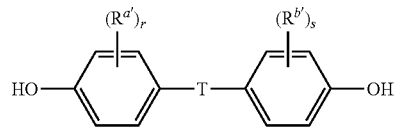

wherein $R^{a'}$ and $R^{b'}$ are each independently $C_{1-12}$ alkyl, T is a $C_{5-16}$ cycloalkylene, a $C_{5-16}$ cycloalkylidene, a $C_{1-5}$ alkylene, a $C_{1-5}$ alkylidene, a arylene, a $C_{7-12}$ arylalkylene, $C_{7-12}$ arylalkylidene, a $C_{7-12}$ alkylarylene, or a arylenealkyl, and r and s are each independently 1 to 4; and
      0 to 75 mole percent of a second carbonate unit derived from a dihydroxy aromatic compound, wherein the first carbonate unit and second carbonate unit are not identical, and wherein the mole percentages of each of the first carbonate unit and the second carbonate unit are based on the total number of moles of first carbonate unit and second carbonate unit;

a polysiloxane-polycarbonate copolymer comprising 0.15 to 30 weight percent of a polysiloxane block comprising siloxane units of the formula

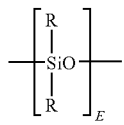

wherein E is on average 4 to 60 units, and each occurrence of R is the same or different and is a $C_{1-13}$ monovalent organic group, and 70 to 99.85 weight percent of a third carbonate unit derived from a dihydroxy aromatic compound, wherein the weight percentages of each of the polysiloxane block and the third carbonate unit are based on the total weight of polysiloxane block and third carbonate unit, and a trans-esterification catalyst present in an amount of 20 to 500 parts per million based on weight, and wherein the trans-esterification catalyst is a tetraalkylphosphonium salt or a tetraalkylammonium salt, wherein an article having a thickness of 3.2 mm and molded from the thermoplastic composition has a Dynatup total energy greater than 50 Joules, as measured at a constant speed of 3.3 to 3.6 m/min at 23° C. according to ASTM D3763-02.

2. The thermoplastic composition of claim 1, wherein the first carbonate unit of the polycarbonate or copolycarbonate is derived from a cyclohexylidene-bridged alkyl-substituted carbonate unit having the formula:

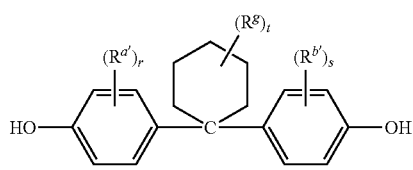

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10, provided that at least one of each of $R^{a'}$ and $R^{b'}$ is disposed meta to the cyclohexylidene bridge.

3. The thermoplastic composition of claim 1, wherein the second carbonate unit of the copolycarbonate is derived from a dihydroxy aromatic compound having the formula:

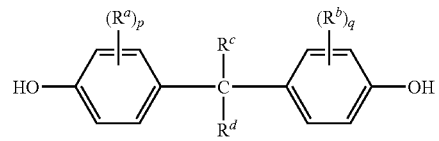

wherein $R^a$ and $R^b$ are each independently halogen; $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl; and p and q are each independently 0 to 4.

4. The thermoplastic composition of claim 1, wherein the copolycarbonate comprises the formula:

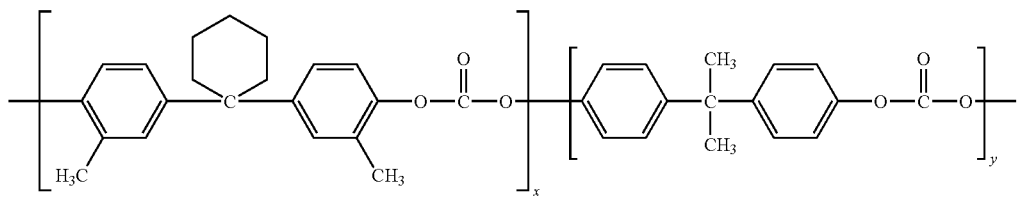

wherein the molar ratio of x toy is 90:10 to 40:60.

5. The thermoplastic composition of claim 1, wherein the polysiloxane block of the polysiloxane-polycarbonate is derived from a polysiloxane having hydroxy end groups and having the formula:

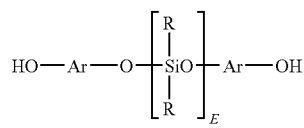

wherein L is 4 to 60, each R is the same or different and is a $C_{1-13}$ monovalent organic group; and Ar is a substituted or unsubstituted $C_{6-30}$ arylene group; or the polysiloxane block of the polysiloxane-polycarbonate is derived from a polysiloxane having hydroxy end groups and having the formula:

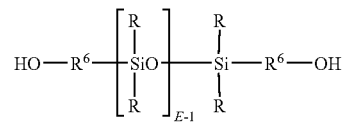

wherein L is on average 4 to 60; each R is the same or different and is a $C_{1-13}$ monovalent organic group, and each $R^6$ is independently a $C_{7-30}$ arylene-alkylene group.

6. The thermoplastic composition of claim 5, wherein the polysiloxane block of the polysiloxane-polycarbonate is derived from a polysiloxane having hydroxy end groups of the formula:

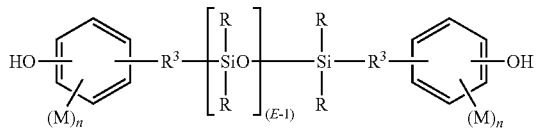

wherein L is on average 4 to 60; each R is the same or different and is a $C_{1-13}$ monovalent organic group, each $R^3$ is independently a divalent $C_{2-8}$ aliphatic group, each M is the same or different and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, and each n is independently 0 to 4.

7. The thermoplastic composition of claim 1, wherein the polysiloxane-polycarbonate comprises the formula:

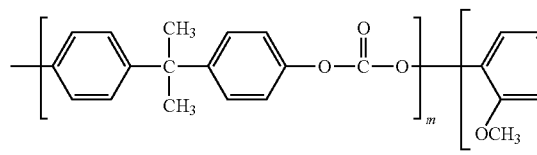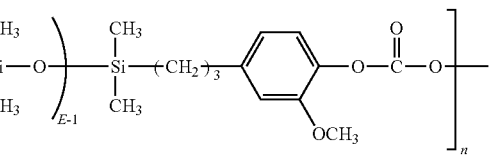

wherein E is on average 4 to 60, and the weight ratio of m to n is 99:1 to 90:10.

8. The thermoplastic composition of claim 1, wherein the polysiloxane-polycarbonate is present in an amount of 10 to 90 weight percent based on the weight of polycarbonate or copolycarbonate and polysiloxane-polycarbonate.

9. The thermoplastic composition of claim 8, wherein the polycarbonate or copolycarbonate has a melt volume rate of less than or equal to 10 cubic centimeters per 10 minutes under a load of 1.2 kilograms and at a temperature of 300° C. according to ASTM D1238-00.

10. The thermoplastic composition of claim 9, wherein the polysiloxane-polycarbonate is present in an amount of greater than 17 weight percent based on the weight of polycarbonate or copolycarbonate and polysiloxane-polycarbonate.

11. The thermoplastic composition of claim 8, wherein the polycarbonate or copolycarbonate has a melt volume rate of less than or equal to 40 cubic centimeters per 10 minutes under a load of 1.2 kilograms and at a temperature of 300° C. according to ASTM D1238-00.

12. The thermoplastic composition of claim 11, wherein the polysiloxane-polycarbonate is present in an amount of greater than 40 weight percent based on the weight of polycarbonate or copolycarbonate and polysiloxane-polycarbonate.

13. The thermoplastic composition of claim 8, wherein the polysiloxane-polycarbonate is present in an amount of greater than 70 weight percent based on the weight of polycarbonate or copolycarbonate and polysiloxane-polycarbonate.

14. The thermoplastic composition of claim 13, wherein an article having a thickness of 3.2 mm and molded from the thermoplastic composition has Dynatup total energy of greater than 50 Joules, as measured at a constant speed of 3.3 to 3.6 m/sec at −20° C. according to ASTM D3763-02.

15. The thermoplastic composition of claim 1, wherein the trans-esterification catalyst is a tetraalkylphosphonium salt.

16. The thermoplastic composition of claim 1, wherein an article having a thickness of 3.2±0.12 mm and molded from the thermoplastic composition has a haze of less than 25% according to ASTM D1003-00.

17. The thermoplastic composition of claim 1, further comprising an additional polymer, wherein the additional polymer is present in an amount of 1 to 50 weight percent based on the weight of rolycarbonate or copolycarbonate and polysiloxane-polycarbonate.

18. The thermoplastic composition of claim 1, further comprising an additive including an impact modifier, a filler, an ionizing radiation stabilizer, an antioxidant, a heat stabilizer, a light stabilizer, an ultraviolet light absorber, a plasticizer, a lubricant, a mold release agent, an antistatic agent, a pigment, a dye, a flame retardant, an anti-drip agent, or a combination comprising at least one of the foregoing additives.

19. An article comprising the thermoplastic composition of claim 1.

20. A thermoplastic composition comprising:

10 to 90 weight percent of a polycarbonate or copolycarbonate comprising:

25 to 100 mole percent of a first carbonate unit derived from a dihydroxy aromatic compound having the formula

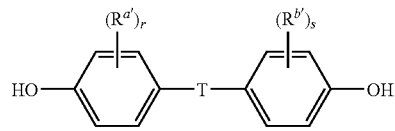

wherein $R^{a'}$ and $R^{b'}$ are each independently $C_{1-12}$ alkyl, T is a $C_{5-16}$ cycloalkylene, a $C_{5-16}$ cycloalkylidene, a $C_{1-5}$ alkylene, a $C_{1-5}$ alkylidene, a arylene, a $C_{7-12}$ arylalkylene, $C_{7-12}$ arylalkylidene, a $C_{7-12}$ alkylarylene, or a arylenealkyl, and r and s are each independently 1 to 4; and 0 to 75 mole percent of a second carbonate unit derived from a dihydroxy aromatic compound wherein the first carbonate unit and second carbonate unit are not identical, and wherein the mole percentages of each of the first carbonate unit and the second carbonate unit are based on the total number of moles of first carbonate unit and second carbonate unit;

10 to 90 weight percent of a polysiloxane-polycarbonate comprising:

0.15 to 30 weight percent of a polysiloxane block comprising siloxane units of the formula

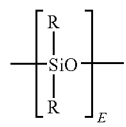

wherein L is on average 4 to 60, and each occurrence of R is the same or different and is a $C_{1-13}$ monovalent organic group, and 70 to 99.85 weight percent of a third carbonate unit derived from a dihydroxy aromatic compound wherein the weight percentages of each of the polysiloxane block and the third carbonate unit are based on the total weight of polysiloxane block and third carbonate unit, and a trans-esterification catalyst present in an amount of 20 to 500 parts per million based on weight, and wherein the trans-esterification catalyst is a tetraalkylphosphonium salt, wherein the weight percentages of each of the copolycarbonate and polysiloxane-polycarbonate are based on the total weight of copolycarbonate and polysiloxane-polycarbonate, and wherein an article having a thickness of 3.2 mm and molded from the thermoplastic composition has a Dynatup total energy of greater than 50 Joules, as measured at a constant speed of 3.3 to 3.6 m/sec at 23° C. according to ASTM D3763-02.

21. A thermoplastic composition consisting essentially of:
a polycarbonate or copolycarbonate consisting essentially of:
25 to 100 mole percent of a first carbonate unit derived from a dihydroxy aromatic compound having the formula

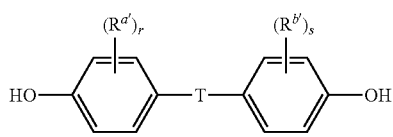

wherein $R^{a'}$ and $R^{b'}$ are each independently $C_{1-12}$ alkyl, T is a $C_{5-16}$ cycloalkylene, a $C_{5-16}$ cycloalkylidene, a $C_{1-5}$ alkylene, a $C_{1-5}$ alkylidene, a arylene, a $C_{7-12}$ arylalkylene, $C_{7-12}$ arylalkylidene, a $C_{7-12}$ alkylarylene, or a arylenealkyl, and r and s are each independently 1 to 4; and 0 to 75 mole percent of a second carbonate unit derived from a dihydroxy aromatic compound wherein the first carbonate unit and second carbonate unit are not identical, and wherein the mole percentages of each of the first carbonate unit and the second carbonate unit are based on the total number of moles of first carbonate unit and second carbonate unit;

a polysiloxane-polycarbonate consisting essentially of
0.15 to 30 weight percent of a polysiloxane block comprising siloxane units of the formula

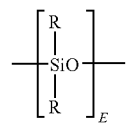

wherein L is on average 4 to 60, and each occurrence of R is the same or different and is a $C_{1-13}$ monovalent organic group, and 70 to 99.85 weight percent of a third carbonate unit derived from a dihydroxy aromatic compound wherein the weight percentages of each of the polysiloxane block and the third carbonate unit are based on the total weight of polysiloxane block and third carbonate unit, a trans-esterification catalyst present in an amount of 20 to 500 parts per million based on weight, and wherein the trans-esterification catalyst is a tetraalkylphosphonium salt, and an additive, wherein an article having a thickness of 3.2 mm and molded from the thermoplastic composition has a Dynatup total energy of greater than 50 Joules, as measured at a constant speed of 3.3 to 3.6 m/sec at 23° C. according to ASTM D3763-02.

22. A method of preparing a thermoplastic composition comprising melt blending:
a polycarbonate or copolycarbonate comprising:
25 to 100 mole percent of a first carbonate unit derived from a dihydroxy aromatic compound having the formula

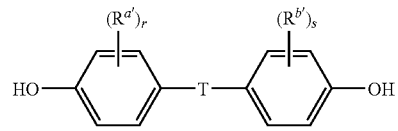

wherein $R^{a'}$ and $R^{b'}$ are each independently $C_{1-12}$ alkyl, T is a $C_{5-16}$ cycloalkylene, a $C_{5-16}$ cycloalkylidene, a $C_{1-5}$ alkylene, a $C_{1-5}$ alkylidene, a arylene, a $C_{7-12}$ arylalkylene, $C_{7-12}$ arylalkylidene, a $C_{7-12}$ alkylarylene, or a arylenealkyl, and r and s are each independently 1 to 4; and 0 to 75 mole percent of a second carbonate unit derived from a dihydroxy aromatic compound wherein the first carbonate unit and second carbonate unit are not identical, and wherein the mole percentages of each of the first carbonate unit and the second carbonate unit are based on the total number of moles of first carbonate unit and second carbonate unit; with a polysiloxane-polycarbonate comprising
0.15 to 30 weight percent of a polysiloxane block comprising siloxane units of the formula

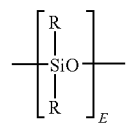

wherein L is on average 4 to 60, and each occurrence of R is the same or different and is a $C_{1-13}$ monovalent organic group, and 70 to 99.85 weight percent of a third carbonate unit derived from a dihydroxy aromatic compound wherein the weight percentages of each of the polysiloxane block and the third carbonate unit are based on the total weight of polysiloxane block and third carbonate unit and a trans-esterification catalyst present in an amount of 20 to 500 parts per million based on weight, and wherein the trans-esterification catalyst is a tetraalkylphosphonium salt, wherein an article having a thickness of 3.2 mm and molded from the thermoplastic composition has a Dynatup total energy of greater than 50 Joules, as measured at a constant speed of 3.3 to 3.6 m/sec at 23° C. according to ASTM D3763-02.

* * * * *